United States Patent
Baba

(10) Patent No.: US 7,334,164 B2
(45) Date of Patent: Feb. 19, 2008

(54) CACHE CONTROL METHOD IN A STORAGE SYSTEM WITH MULTIPLE DISK CONTROLLERS

(75) Inventor: Takashige Baba, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 614 days.

(21) Appl. No.: 10/876,549

(22) Filed: Jun. 28, 2004

(65) Prior Publication Data

US 2005/0097402 A1     May 5, 2005

(30) Foreign Application Priority Data

Oct. 16, 2003   (JP)   ............... 2003-356450

(51) Int. Cl.
 *G06F 11/00* (2006.01)
(52) U.S. Cl. .................................................. 714/42
(58) Field of Classification Search .................. 714/42, 714/6, 8, 13
See application file for complete search history.

(56) References Cited

U.S. PATENT DOCUMENTS

| | | | | |
|---|---|---|---|---|
| 5,617,530 A | * | 4/1997 | Stallmo et al. | ................ 714/6 |
| 5,835,703 A | * | 11/1998 | Konno | ........................ 714/42 |
| 6,330,642 B1 | | 12/2001 | Carteau | |
| 6,438,647 B1 | | 8/2002 | Nielson et al. | |
| 6,457,098 B1 | * | 9/2002 | DeKoning et al. | .......... 711/114 |
| 6,802,023 B2 | * | 10/2004 | Oldfield et al. | ................ 714/7 |

* cited by examiner

*Primary Examiner*—Nadeem Iqbal
(74) *Attorney, Agent, or Firm*—Reed Smith LLP; Stanley P. Fisher, Esq.; Juan Carlos A. Marquez, Esq.

(57) ABSTRACT

In a storage device including plural disk controllers, the invention reduces time required for failure recovery when a failure occurs in the disk controllers. The storage device includes n (n>2, where n is an integer) disk controllers. The disk controller includes a cache memory. Data of the cache memory is copied to another cache memory. When a failure occurs in the disk controller, data not written to a disk of the data copied to the cache memory is transferred to further another cache memory.

13 Claims, 10 Drawing Sheets

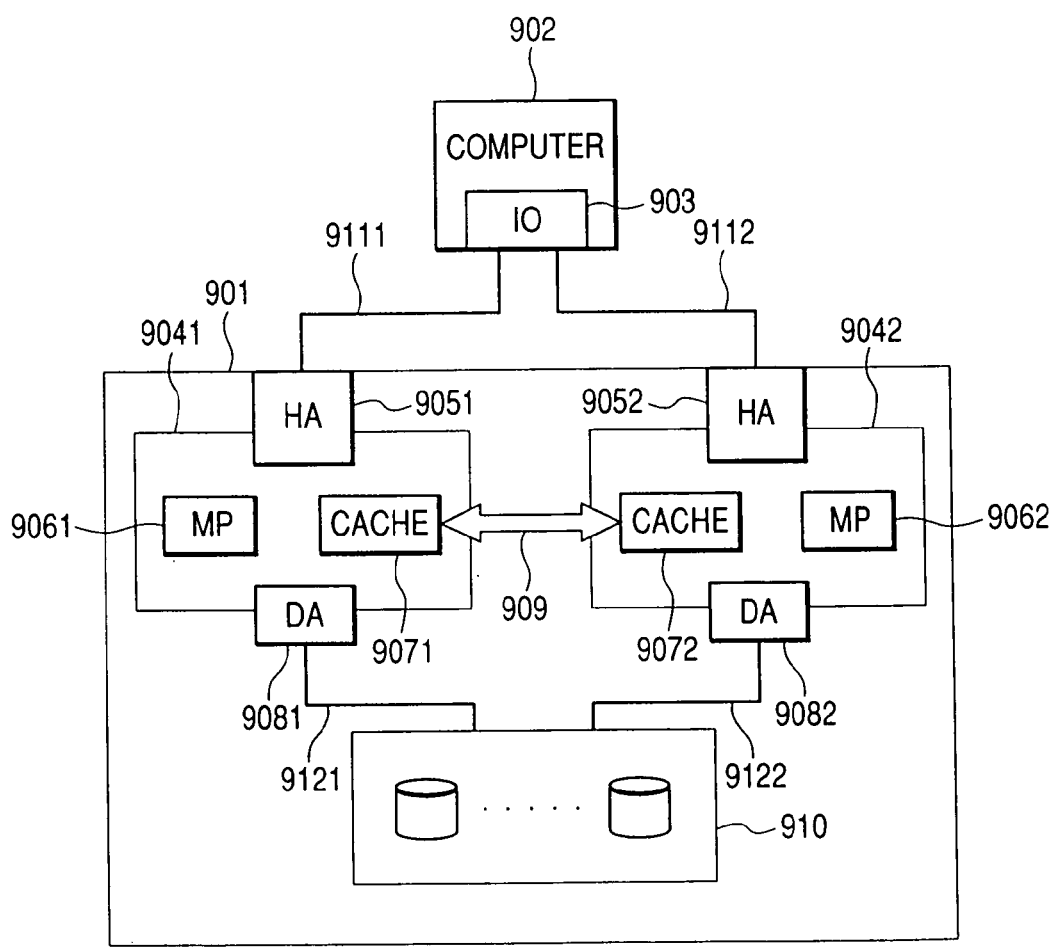
Prior Art  FIG. 9

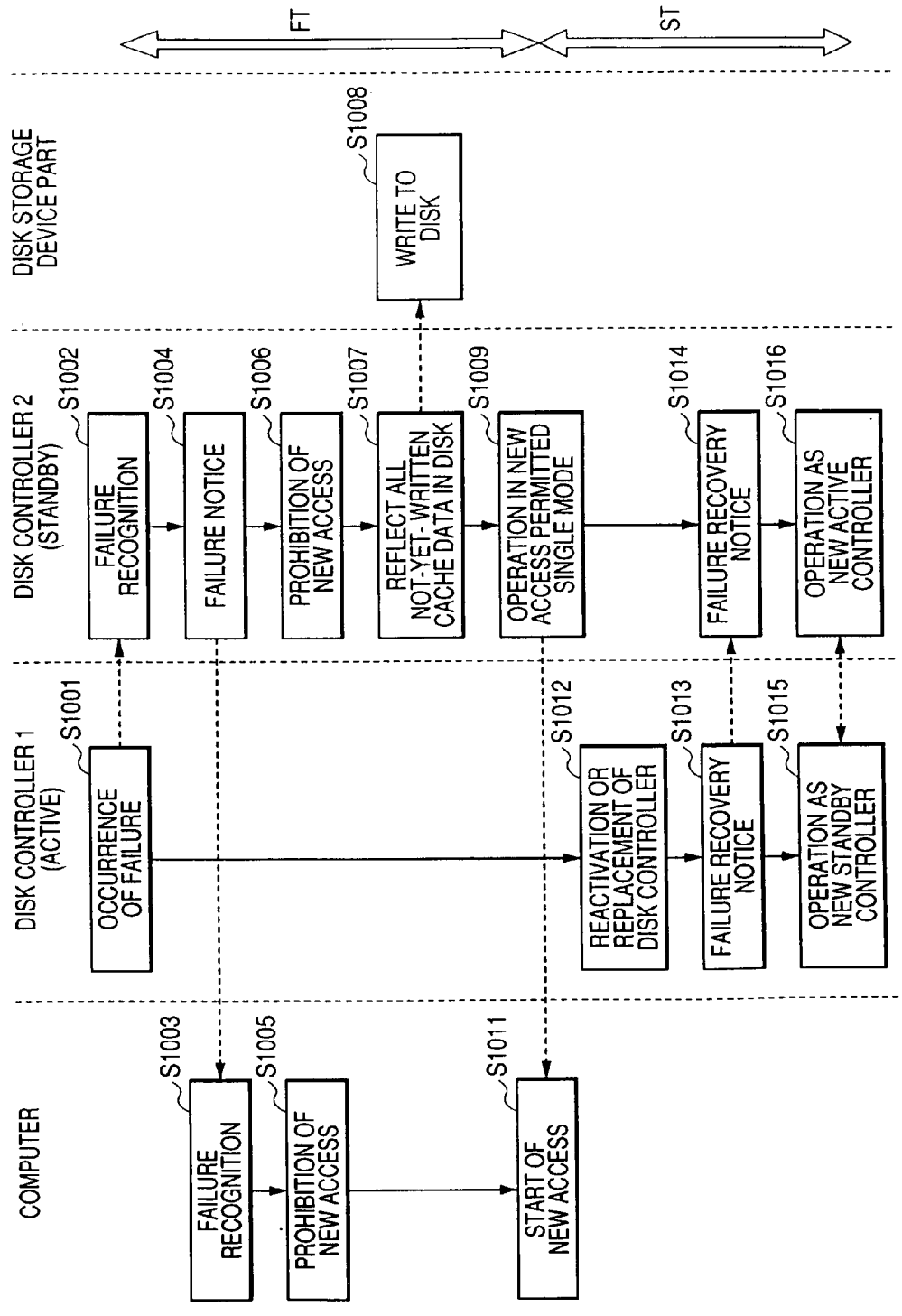
Prior Art FIG. 10

CACHE CONTROL METHOD IN A STORAGE SYSTEM WITH MULTIPLE DISK CONTROLLERS

CLAIM OF PRIORITY

The present application claims priority from Japanese application JP 2003-356450 filed on Oct. 16, 2003, the content of which is hereby incorporated by reference into this application.

FIELD OF THE INVENTION

The present invention relates to a method of controlling disk controllers in a storage device including the disk controllers controlling communication between a computer and a storage device. More particularly, the present invention relates to a method of changing the configuration of n (n>2, where n is an integer) disk controllers included in a storage device and a method of recovery from failures in the disk controllers.

BACKGROUND OF THE INVENTION

In enterprises and data centers, storage devices including plural disks are used to store a large amount of data. Recently, in addition to transaction processing systems such as conventional sales management, stock control, and financial management, new businesses such as electronic commerce systems by use of the Internet and systems for WEB service have been increasing, and storage capacity required to store data produced as a result has been increasing year by year. Therefore, the storage devices are required to be capable of continuous addition of disk storage devices to provide for increasing data capacity. Since halting a main transaction processing system of an enterprise especially causes a great loss, a storage device used in the system is required to be highly reliable enough to minimize the influence of failures. As storage devices meeting these requirements, a variety of disk array devices such as described in patent document 1 and patent document 2 are marketed from storage device venders.

The configuration of a conventional storage device will be described with reference to FIG. 9.

The storage device 901 is connected to a computer 902 that makes data access to the storage device 901. The storage device 901 includes a disk storage device part 910, and disk controllers 9041 and 9042. The disk storage device part 910 comprises plural disk storage devices.

The disk controller 9041 and the like, which control data access between the computer 902 and the disk storage devices 910, include cache memories 9071 and 9072, and microprocessors (MP) 9061 and 9062. The cache memory 9071 and the like temporarily store data to speed up data access. The microprocessor 9061 and the like manage the cache memory 9071 and the like, control communication between the computer 902 and the disk controller 9041 and the like, control communication between the disk controller 9041 and the like and the disk storage device part 910, and manages the storage of data to the disk storage device part 910.

Between the computer 902 and the disk controllers 9041 and 9042, an interface card (IO) 903 within the computer 902 is connected with host adapter cards (HA) 9051 and 9052 of the disk controller 9041 and the like through an optical fiber or metallic cables 9111 and 9112, and data is transmitted and received between them using protocols such as fiber channel and SCSI. On the other hand, between the disk controllers 9041 and 9042 and the disk storage device part 910, data is transmitted and received using protocols such as, e.g., fiber channel and SCSI through disk adaptor cards (DA) 9081 and 9082, and an optical fiber or metallic cables 9121 and 9122.

Next, a description is made of how the computer 902 accesses the storage device 901. When the computer 902 accesses (data write or data read) data stored in the storage device 901, the computer 902 selects one (9041, for example) of the two disk controllers 9041 and 9042 and accesses the disk storage device part 910 through the disk controller 9041. The accessed data is temporarily stored in the cache memory 9071. Since the computer 902 accesses a semiconductor memory having a higher data access speed than the disk storage device part 910, data access speed improves.

Here, the data of the cache memory 9071 is copied to the cache memory 9072 of the other disk controller 9042, through an inter-memory channel 909 (mirroring). Since the disk controllers are thus duplicated, even if a failure occurs in one of the disk controllers, data access can be made to the other, providing high reliability for the storage devices.

[Patent document 1] U.S. Pat. No. 6,438,647
[Patent document 2] U.S. Pat. No. 6,330,642

FIG. 10 is a sequence diagram showing a failure recovery procedure when a failure occurs in a disk controller 1 (9041, for example) in a conventional storage device (FIG. 9). When a failure occurs in the disk controller 1 (S1001), between the two disk controllers, a disk controller 2 (9042, for example) recognizes the failure by a failure monitoring method such as heart beat (S1002). The disk controller 2 notifies the computer 902 of the occurrence of the failure in the disk controller 1 (S1004), and prohibits a new access (S1005, S1006). At this point, cache data (not-yet-written cache data) on the cache memory of the disk controller 2 which is not yet written to the disk storage device part 910 is not duplicated. Therefore, when a failure occurs in the disk controller 2 as well, the not-yet-written data cannot be restored. This is referred to as data loss that poses a serious problem in terms of reliability. As failure recovery processing for preventing the data loss, the disk controller 2 immediately writes the not-yet-written cache data to the disk storage device part 910 (S1007, S1008).

However, writing to the disk storage device part 910 requires more time compared with writing to the cache memory 9071 and the like, which are semiconductor memories. Therefore, access prohibition period FT for the storage device becomes long, exerting a serious influence on operations.

After writing the not-yet-written cache data to the disk storage device 910, the disk controller 2 permits a new access to the computer 902 (S1009). The computer 902 starts data access to the disk controller 2 (S1011) The disk controller 1 in which the failure occurred performs failure recovery by resetting or making replacement (S1012). The disk controller 1 notifies the disk controller 2 of failure recovery (S1013).

The disk controller 2 recognizes this event (S1014), and a duplex system consisting of the two disk controllers 1 and 2 is configured to return to a normal state (S1015, S1016). As a result, the system recovers to the normal state, and data access speed is increased by temporarily storing data in the cache memory during data write access.

However, in the period ST during which the system returns to the normal state (S1015, S1016) after a new access is permitted (S1009), data access is made only to the disk controller 2 because the disk controller 1 in which the failure occurs is not operating. Accordingly, for data write access, each time access is made, data must be written to the disk to prevent data loss. As a result, the data access speed in the period ST decreases greatly.

For reasons other than failure occurrence such as maintenance work, change of device configuration may be required. However, halting a system for each occurrence of such an event causes a great loss, especially in the case of a main transaction processing system of enterprises.

SUMMARY OF THE INVENTION

The present invention has been made in view of such problems and provides a storage device and a disk controller control method that reduce the storage access halt period FT, achieve high reliable and high-speed data access in the period ST until failure recovery, and enable maintenance without halting the system.

According to a first aspect of the present invention, a control method of a storage device comprise: a storage device part including plural storage media; plural control parts each including a processor that controls data writing from a computer to the storage device part and data reading from the storage device part to the computer, and a cache memory that temporarily stores the data; and a management part that detects a failure that occurs in the control parts. Herein, communication-capable connection is made between the storage device part and the control parts, and between the control parts. The method comprises the steps of: when the computer has written data to the storage device, writing the data to a cache memory of an active control part of the control parts, and copying the data from the cache memory of the active control part to a cache memory of a standby control part; and when it is detected by the management part that a failure occurs in the active or standby control part, transferring data not written to the storage device part of data stored in a cache memory of the active or standby control part in which the failure does not occur, to a cache memory of a control part other than the active and standby control parts.

According to a second aspect of the present invention, a control method of a storage device comprise: a storage device part including plural storage media; plural control parts each including a processor that controls data writing from a computer to the storage device part and data reading from the storage device part to the computer, and a cache memory that temporarily stores the data; and a management part that manages the configuration of the control parts. Herein, communication-capable connection is made between the storage device part and the control-parts, and between the control parts. The method comprises the steps of: when the computer has written data to the storage device, writing the data to a cache memory of a active control part of the control parts, and copying the data from the cache memory of the active control part to a cache memory of a standby control part; and when the management part commands change of the configuration of the control parts, transferring data stored in a cache memory of the active or standby control part to a cache memory of a control part other than the active and standby control parts.

According to the first aspect of the invention, in the storage device including plural disk controllers, when a failure occurs in a disk controller, not-yet-written cache data on a cache memory of the disk controller is not written to a disk storage device having a slow data access speed but instead is copied to a cache memory of a different disk controller, which is a semiconductor memory having a high data access speed. Thus, in a failure recovery procedure, the time for which the computer is prohibited from making data access to the storage device can be reduced. When access to new data is subsequently permitted, since the cache memories have been duplicated, operations can be performed without reducing the data access speed. In this way, according to the first aspect of the invention, the storage device can be made highly reliable without reducing data access performance.

According to the second aspect of the invention, by copying data of a cache memory of a disk controller being used to a cache memory of a disk controller being not used, the disk controller being used can be disused to be dismounted for maintenance or used as a disk controller for data access of a different computer. Moreover, a disk controller newly added can be used.

BRIEF DESCRIPTION OF THE DRAWINGS

FIG. 9 is a block diagram showing the configuration of a conventional storage device; and FIG. 10 is a sequence diagram showing processing when a failure occurs in an active disk controller in a conventional storage device.

DETAILED DESCRIPTION OF THE PREFERRED EMBODIMENTS

Hereinafter, embodiments of the present invention will be described with reference to the drawings.

Figure 1:
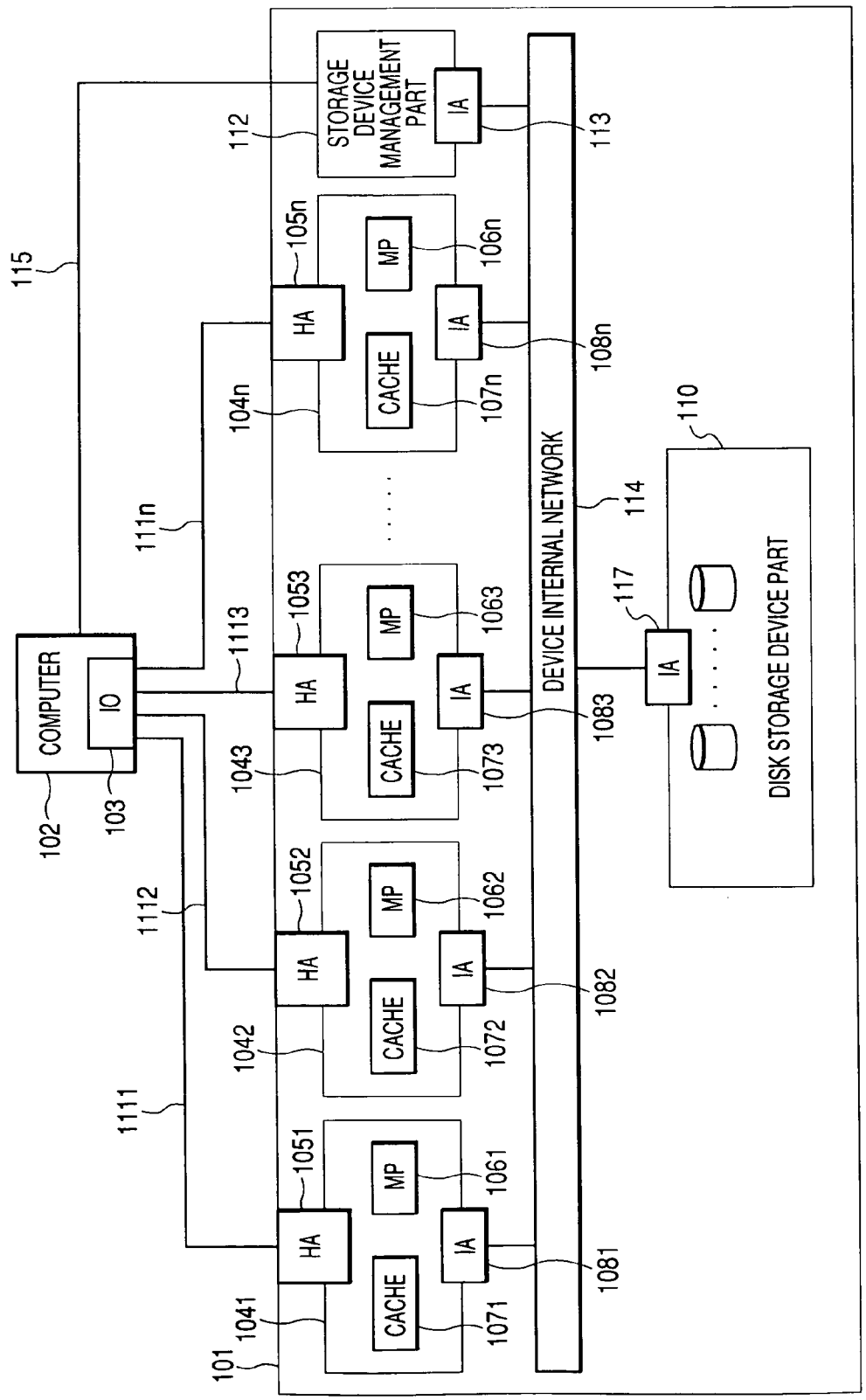
FIG. 1 is a block diagram showing the configuration of a storage device of a first embodiment of the present invention.

FIG. 1 is a block diagram showing the configuration of a storage device of a first embodiment of the present invention.

In FIG. 1, a storage device 101 to which the present invention is applied is connected to a computer 102 that accesses data of the storage device 101. The storage device 101 is provided with a disk storage device part 110 for storing data.

The storage device 101, like the conventional storage device (FIG. 9), is provided with n disk controllers 1041, 1042, 1043 . . . 104n (n>2, where n is an integer) that control data access between the computer 102 and the disk storage device part 110. The disk controllers 1041 to 104n include cache memories 1071, 1072, 1073 . . . 107n and microprocessors (MP) 1061, 1062, 1063, . . . , 106n, respectively. The cache memories 1071 to 107n are semiconductor memories that, to speed up data access, temporarily store data to be written to the disk storage device part 110 and data read from the disk storage device part 110.

The microprocessors 1061 to 106n manage cache memories 1071 to 107n, control communication between the computer 102 and the disk controllers 1041 to 104n, control communication between the disk controllers 1041 to 104n and the disk storage device part 110, and manage data stored in the disk storage device part 110. Under control of the microprocessors 1061 to 106n, for example, RAID can be formed which allows plural disk storage devices of the disk storage device part 110 to be used as one disk storage device.

Data communication between the computer 102 and the disk controllers 1041 to 104n is conducted using protocols such as, e.g., fiber channel and SCSI between an interface card (IO) 103 within the computer and host adapter cards (HA) 1051, 1052, 1053, . . . , and 105n within the disk controllers which are connected through optical fibers or metallic cables 1111, 1112, 1113, . . . , and 111n.

On the other hand, the disk controllers 1041 to 104n and the disk storage device part 110 are connected with each other using a device internal network 114 such as, e.g., InfiniBand through interface adaptors (IA) 1081, 1082, 1083, . . . , 108n, and 117 so that data is transmitted and received between them. A storage device management part 112 is connected with the disk controllers 1041 to 104n and the disk storage device part 110 through an interface adaptor 113 and the device internal network 114. Through communication with them, the storage device management part 112 monitors failures of the disk controllers 1041 to 104n and the disk storage device part 110 within the storage device 101, manages configuration information of the storage device 101, and collects load information on data access to the disk controllers 1041 to 104n and usage rate information on the cache memories 1071 to 107n.

In FIG. 1, to briefly describe operation, one computer 102 and one disk storage device part 110 are shown. However, generally, m (m>0, where m is an integer) computers and k (k>0, where k is an integer) disk storage device parts may be provided.

Next, a description is made of how the computer 102 accesses the storage device 101. When the computer 102 accesses (data write or data read) data stored in the storage device 101, one of the n disk controllers 1041 to 104n is allocated as an active disk controller, another as a standby one, and the remaining n−2 as backup ones not participating in data access. For example, 1041 is allocated as an active disk controller, 1042 as a standby one, and 1043, . . . , and 104n as backup ones.

The computer 102 accesses the disk storage device part 110 through the active disk controller 1041. Here, according to a command to a device driver (not shown in the figure) within the computer 102 from the storage device management part 112, the data access path 1111 to the disk controller 1041 is selected. Access data (data written to the storage device 101 or data read from the storage device 101) is temporarily stored in the cache memory 1071. Since the cache memory 1071 is a semiconductor memory having a higher data access speed than the disk storage device part 110, by the computer's 102 accessing the cache memory 1071 instead of accessing the disk storage device 110, data access speed improves.

Here, the data of the cache memory 1071 is copied to the cache memory 1072 of the standby disk controller 1042 through, e.g., the device internal network 114 (mirroring). Thus, if the same data is contained in the cache memories 1071 and 1072 of the disk controllers 1041 (active) and 1042 (standby), even if a failure occurs in one of the disk controllers, the data of the cache memory of the other remains. Since the computer 102 can access the data, no data loss occurs and the reliability of the storage device 101 improves.

Here, mirroring is shown to simplify the description. However, for example, of cache data stored in the cache memory 1071, only write data may be copied to the cache memory 1072. This is because since read data of cache data has been copied from the disk storage device part 110, the data will not be lost even if a failure occurs in the disk controller 1041.

In the present invention, cache data of the disk controllers 1041 to 104n includes metadata not shown. The metadata includes data having been conventionally used such as a logic address value of the cache data, an identifier for identifying whether the cache data is write data or read data, an identifier indicating whether a write has been made to disk, and an identifier indicating cache data resident in a cache memory, as well as an identifier indicating active cache data or standby cache data, and an identifier (duplex target identifier) indicating a disk controller that, when the cache data is active, includes a cache memory to which a copy of the data has been written, and when the cache data is standby, includes a cache memory to which data to produce a copy of the data from has been written. Here, the cache data resident in a cache memory is data defined to be resident in the cache memory regardless of whether it has been written to the disk storage device part 110. For example, by allowing data frequently accessed to reside in a cache memory, data access speed can be improved.

In FIG. 1 when a failure occurs in one of the disk controllers, configuration change is made to replace the disk controller by one of the n−2 backup disk controllers. This enables faster failure recovery. By searching the metadata at the time of the configuration change, which cache data to transfer to another disk controller can be determined.

Next, the failure recovery procedure will be described with reference to FIGS. 2 and 3.

Figure 2:
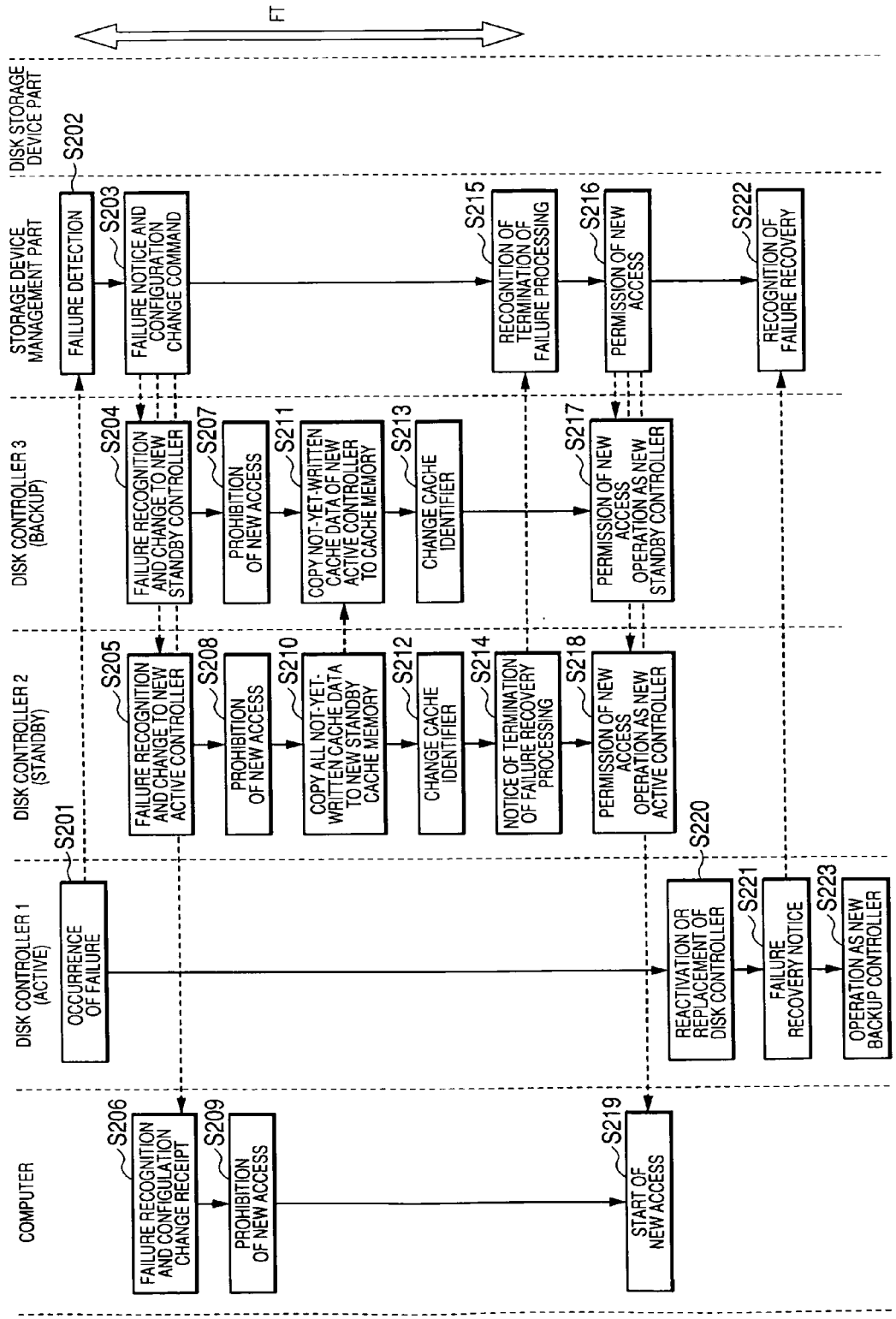
FIG. 2 is a sequence diagram showing processing when a failure occurs in an active disk controller in the storage device of the first embodiment of the present invention.

FIG. 2 is a sequence diagram showing processing when a failure occurs in an active disk controller in the storage device of the first embodiment of the present invention.

When a failure occurs in a disk controller (e.g., 1041) operating as an active one (S201), the storage device management part 112 detects the failure by a failure monitoring method such as, e.g., heart beat (S202). The storage device management part 112 notifies the disk controllers and the computer 102 of failure occurrence in the disk controller 1 and information on configuration change for failure recovery (S203). In this embodiment, the configuration of the storage device 101 is changed to use a standby disk controller 2 (e.g., 1042) as a new active one and a backup disk controller 3 (e.g., 1043) as a new standby one.

Upon receipt of a command (S203) from the storage device management part 112, the disk controller 2 recognizes the failure and starts processing for change to a new active disk controller (S205), and prohibits new access by the computer 102 (S208). On the other hand, upon receipt of the command (S203) from the storage device management part 112, the disk controller 3 recognizes the failure and starts processing for change to a new standby disk controller (S204), and prohibits new access by the computer 102 (S207). The computer 102 recognizes the failure by the command (S203) from the storage device management part 112 (S206), and prohibits new access to the storage device 101 (S209).

At this point, among data on the cache memory of the standby disk controller 2, cache data not written to the disk storage device (not-yet-written cache data) is not duplicated. Therefore, if a failure occurs in the disk controller 2 as well, the not-yet-written cache data cannot be restored. As a failure recovery processing for preventing this, the not-yet-written cache data of the disk controller 2 is not immediately written to the disk storage device 110 as it was conventionally, and instead the not-yet-written cache data stored in the standby cache memory 1072 is transferred to the cache memory 1073 of the new standby disk controller 3 (S210, S211). Since the cache memory 1073 is a semiconductor memory having a higher data access speed than the disk storage device part 110, the time FT required for failure recovery processing can be significantly reduced.

After termination of the transfer of the cache data, of metadata included in the cache data, an identifier indicating active cache data or standby cache data, and a duplex target identifier are changed so as to match the configuration change of the disk controllers (S212, S213). After performing the processing, the disk controller 2 notifies the storage device management part 112 of the termination of the failure recovery processing (S214).

The storage device management part 112 recognizes the termination of the failure recovery processing (S215), and notifies the computer 102, the disk controller 2, and the disk controller 3 of the permission of new access (S216). As a result, the disk controller 2 starts operation as a new active one and the disk controller 3 as a new standby one (S217, S218), and the computer 102 starts new access to the storage device 101 (S219).

Although the disk controller 1 in which the failure occurred is not operating at this point, data has been duplicated between the disk controller 2 (new active) and the disk controller 3 (new standby). Therefore, the system can return to a normal state in which data is temporarily stored in a cache memory during data access to speed up data access.

Upon recovery from the failure by resetting or making replacement (S220), the disk controller 1 in which the failure occurred notifies the storage device management part of failure recovery (S221). The storage device management part 112 recognizes the failure recovery (S222). Thereby, the disk controller 1 starts operation as a new standby one (S223).

Figure 3:
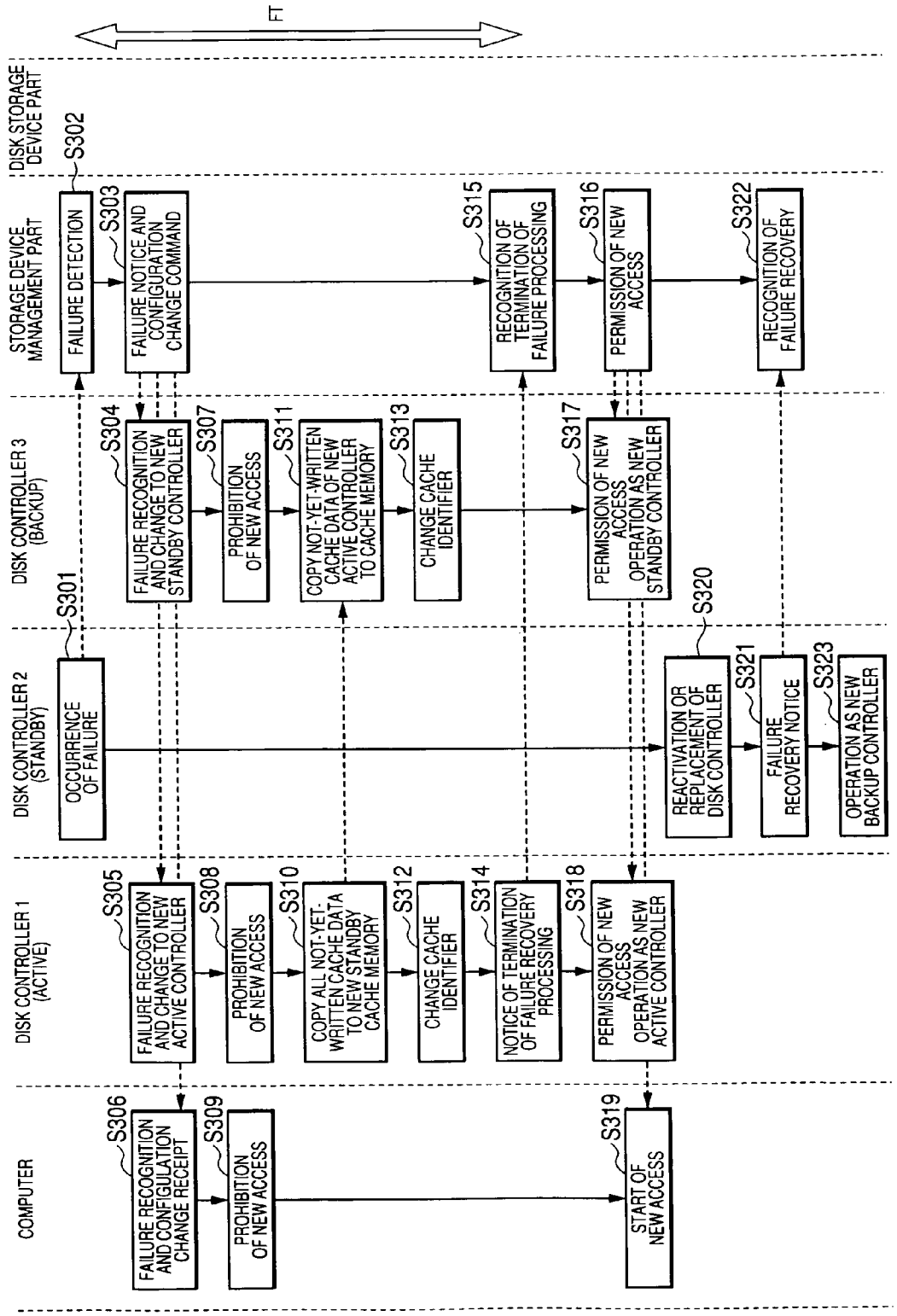
FIG. 3 is a sequence diagram showing processing when a failure occurs in a standby disk controller in the storage device of the first embodiment of the present invention.

FIG. 3 is a sequence diagram showing processing when a failure occurs in a standby disk controller in the storage device of the first embodiment of the present invention. FIG. 3 is different from FIG. 1 in that the disk controller 1 continues to operate as a new active one and the disk controller 3 operates as a new standby one. However, a procedure for the processing is almost the same as that shown in FIG. 2.

When a failure occurs in the disk controller 2 (e.g., 1042) operating as a standby one (S301), the storage device management part 112 detects the failure (S302). The storage device management part 112 notifies the disk controllers and the computer 102 of failure occurrence in the disk controller 2 and information on configuration change for failure recovery (S303). In this embodiment, the configuration of the storage device 101 is changed to continue the active disk controller 1 (e.g., 1041) as a new active one and use a backup disk controller 3 (e.g., 1043) as a new standby one.

Upon receipt of a command (S303) from the storage device management part 112, the disk controller 1 recognizes the failure and starts processing for change to a new active disk controller (S305), and prohibits new access by the computer 102 (S308). On the other hand, upon receipt of the command (S303) from the storage device management part 112, the disk controller 3 recognizes the failure and starts processing for change to a new standby disk controller (S304), and prohibits new access by the computer 102 (S307). The computer 102 recognizes the failure by the command (S303) from the storage device management part 112 (S306), and prohibits new access to the storage device 101 (S309).

Next, to duplex not-yet-written cache data, not-yet-written cache data of the cache memory 1071 of the new active disk controller 1 is transferred to the cache memory 1073 of the new standby disk controller 3 (S310, S311).

After termination of the transfer of the cache data, of metadata included in the cache data, an identifier indicating active cache data or standby cache data, and a duplex target identifier are changed so as to match the configuration change of the disk controllers (S312, S313). After performing the processing, the disk controller 1 notifies the storage device management part 112 of the termination of the failure recovery processing (S314).

The storage device management part 112 recognizes the termination of the failure recovery processing (S315), and notifies the computer 102, the disk controller 1, and the disk controller 3 of the permission of new access (S316). As a result, the disk controller 1 and the disk controller 3 start operation as a new active one and a new standby one, respectively (S317, S318), and the computer 102 starts new access to the storage device 101 (S319). The system returns to a normal state.

Upon recovery from the failure by resetting or making replacement (S320), the disk controller 2 in which the failure occurred notifies the storage device management part of failure recovery (S321). The storage device management part 112 recognizes the failure recovery (S322). Thereby, the disk controller 2 starts operation as a new standby one (S323).

In S210 and S211 of FIG. 2 and S310 and S311 of FIG. 3, in addition to the not-yet-written cache data, the cache data resident on the cache memory may be copied. By doing so, since data frequently accessed has been duplicated when new access is permitted, in comparison with the case where only the not-yet-written cache data is copied, a speed closer to the access speed before the failure occurrence can be obtained.

Next, referring to FIGS. 4 and 5, a description will be made of a procedure for changing the configuration of active and standby disk controllers in the storage device of the first embodiment of the present invention. By using the procedure, when the storage device is normally operating, the disk controllers may be added or deleted for the purpose of load dispersion for avoiding the concentration of data access.

Figure 4:
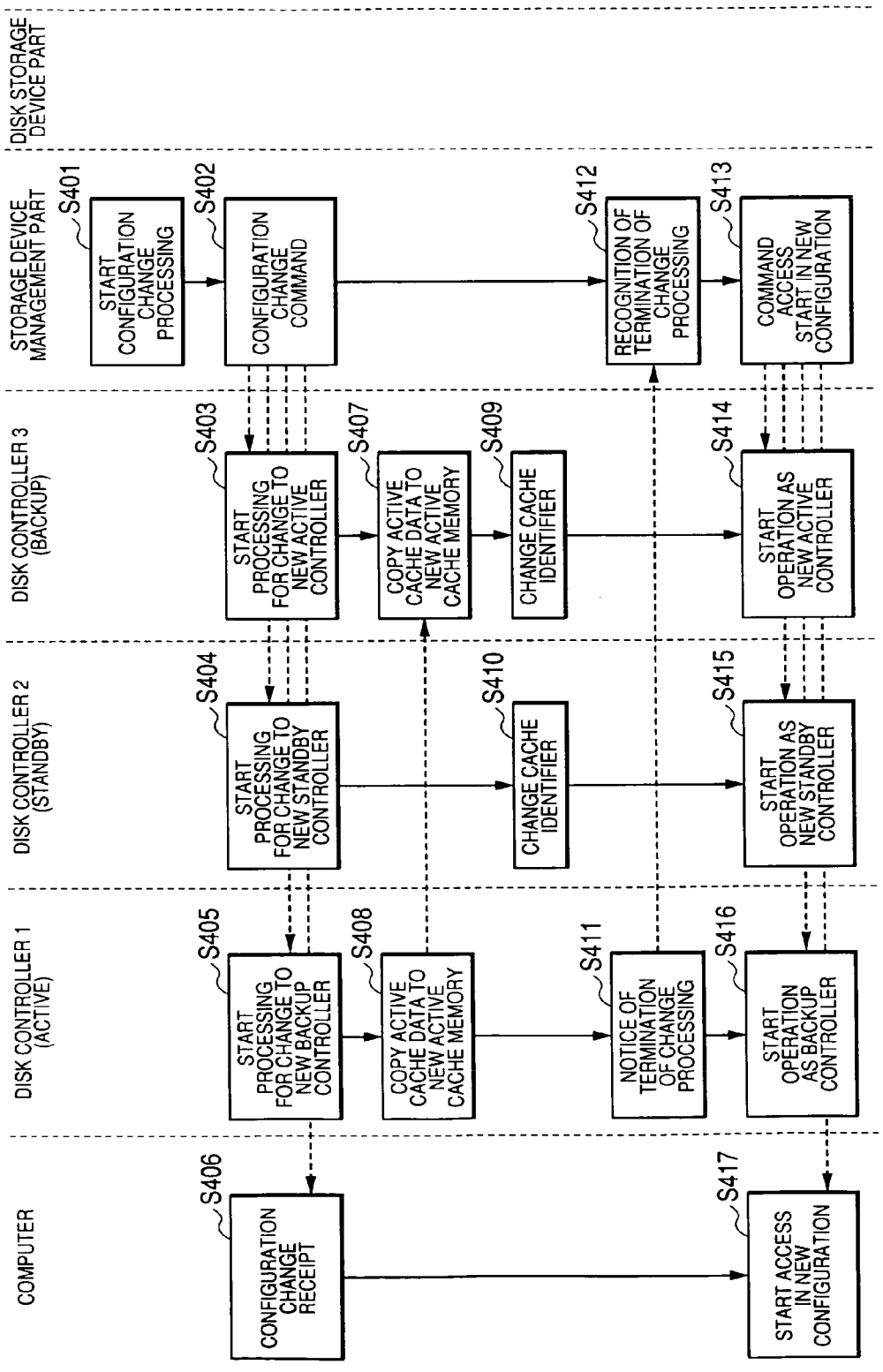
FIG. 4 is a sequence diagram showing processing for changing disk controller configuration so as to use an active disk controller as a backup one and a backup disk controller as an active one in the storage device of the first embodiment of the present invention.

FIG. 4 is a sequence diagram showing processing for changing disk controller configuration so as to use an active disk controller as a backup one and a backup disk controller as an active one in the storage device of the first embodiment of the present invention.

The configuration change procedure is started by a command from the operator or management software (S401). The storage device management part 112 commands the computer 102 and the disk controllers to change the configuration (S402). The computer 102 recognizes the configuration change of the storage device 101 by the command (S402) (S406). An active disk controller 1 recognizes the configuration change by the command (S402), and starts processing for configuration change to a new backup disk controller (S405). A standby disk controller 2 recognizes the configuration change by the command (S402) and starts processing for configuration change to a new standby disk controller (S404). A backup disk controller 3 recognizes the configuration change by the command (S402) and starts processing for configuration change to a new active disk controller (S403).

Next, cache data of the active disk controller 1 is transmitted to the cache memory 1073 of the disk controller 3 (S407, S408). By thus having cache data beforehand before operation is started in the changed configuration, access to the disk storage device part 110 having a slow data access speed decreases, and data access performance improves.

After the copying of cache data, metadata on the configuration change of the disk controllers is rewritten. Here, the identifier indicating active cache data or standby cache data, and the duplex target identifier are changed so as to match the configuration change of the disk controllers (S409, S410).

After performing the processings, the disk controller 1 notifies the storage device management part 112 of the termination of the change processing (S411). The storage device management part 112 recognizes the termination of the configuration change processing (S412), and commands the computer 102 and the disk controllers to make data access in the new configuration (S413). As a result, the disk controller 1 starts operation as a new backup one, the disk controller 2 as a new standby one, and the disk controller 3 as a new active one (S414, S415, S416). The computer 102 starts new access to the storage device 101 whose configuration has been changed (S417).

Figure 5:
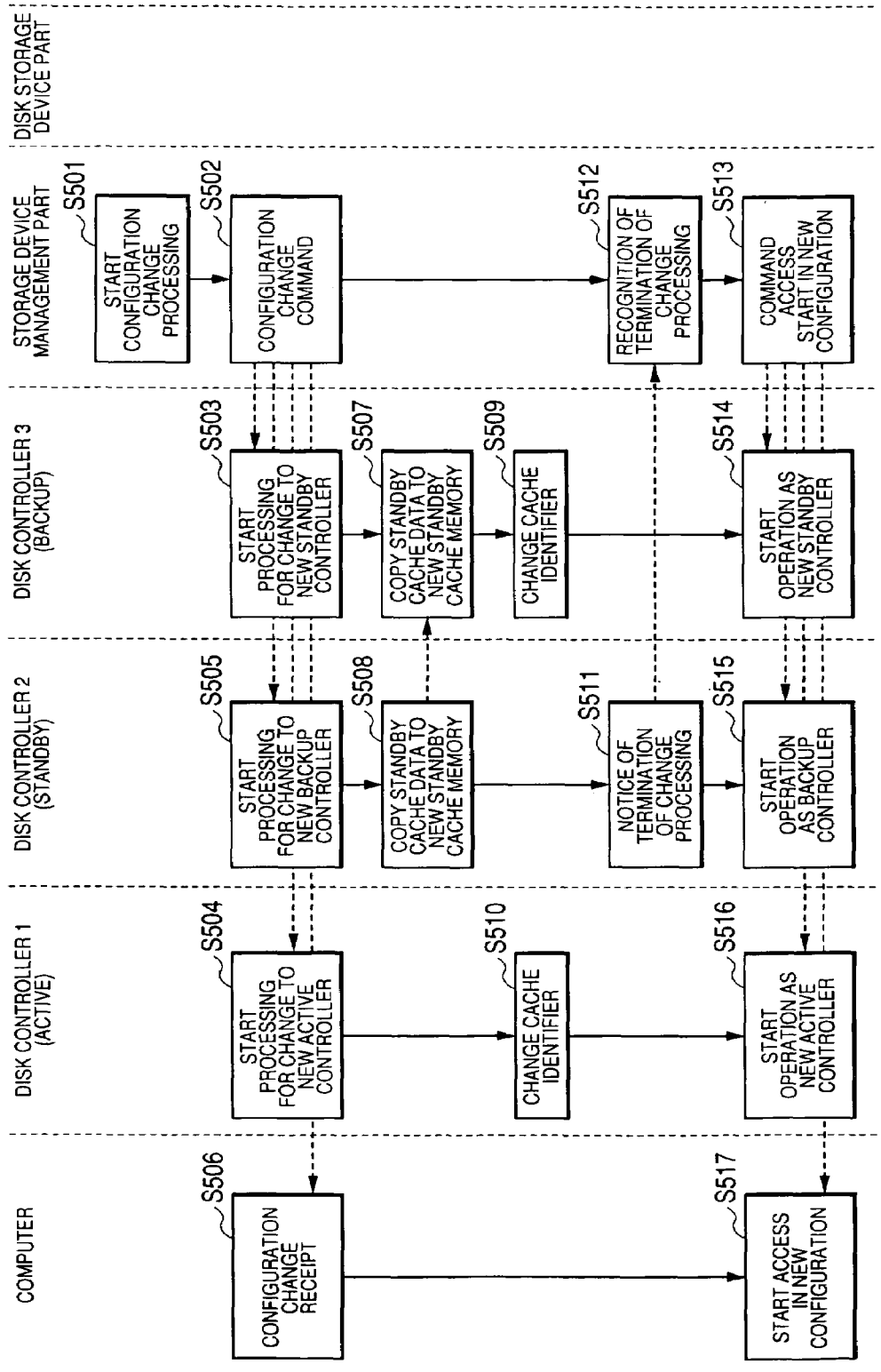
FIG. 5 is a sequence diagram showing processing for changing disk controller configuration so as to use a standby disk controller as a backup one and a backup disk controller as a standby one in the storage device of the first embodiment of the present invention.

FIG. 5 is a sequence diagram showing processing for changing disk controller configuration so as to use a standby disk controller as a backup one and a backup disk controller as a standby one in the storage device of the first embodiment of the present invention.

The configuration change procedure is started by a command from the operator or management software (S501). The storage device management part 112 commands the computer 102 and the disk controllers to change the configuration (S502). The computer 102 recognizes the configuration change of the storage device 101 by the command (S502) (S506). An active disk controller 1 recognizes the configuration change by the command (S502), and starts processing for configuration change to a new active disk controller (S505). A standby disk controller 2 recognizes the configuration change by the command (S502) and starts processing for configuration change to a hew backup disk controller (S504). A backup disk controller 3 recognizes the configuration change by the command (S502) and starts processing for configuration change to a new standby disk controller (S503).

Next, cache data of the active disk controller 1 is transmitted to the cache memory 1073 of the disk controller 3 (S507, S508). By thus having cache data beforehand before operation is started in the changed configuration, access to the disk storage device part 110 having a slow data access speed decreases, and data access performance improves.

After the copying of cache data, metadata on the configuration change of the disk controllers is rewritten. Here, the identifier indicating active cache data or standby cache data, and the duplex target identifier are changed so as to match the configuration change of the disk controllers (S509, S510).

After performing the processings, the disk controller 2 notifies the storage device management part 112 of the termination of the change processing (S511). The storage device management part 112 recognizes the termination of the configuration change processing (S512), and commands the computer 102 and the disk controllers to make data access in the new configuration (S513). As a result, the disk controller 1 starts operation as a new backup one, the disk controller 2 as a new backup one, and the disk controller 3 as a new standby one (S514, S515, S516). The computer 102 starts new access to the storage device 101 whose configuration has been changed (S517).

In the failure recovery procedures shown in FIGS. 2 and 3, during transfer of cache data, access to a disk controller of transfer source and a disk controller of transfer destination is prohibited. On the other hand, in the configuration change procedures shown in FIGS. 4 and 5, since the cache data is duplicated, cache data can be copied in a state in which access to a disk controller of transfer source and a disk controller of transfer destination is permitted.

If the procedures shown in FIGS. 4 and 5 are used, active or standby disk controllers being used can be changed to backup ones, dismounted for maintenance, or operated as disk controllers for data access of other computers. Also, a disk controller newly added can be used as an active or standby one.

Figure 6:
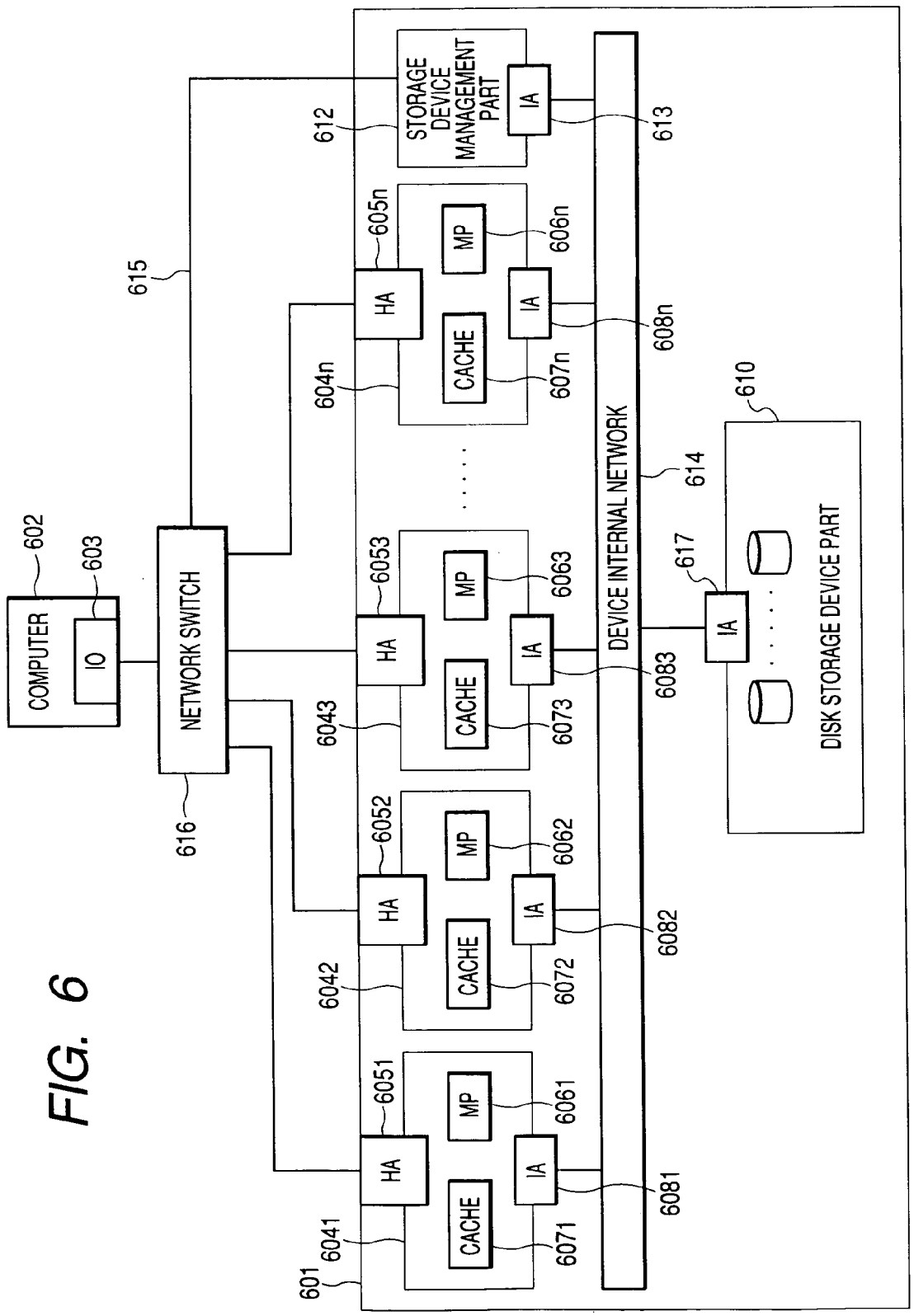
FIG. 6 is a block diagram showing the configuration of a storage device of a second embodiment of the present invention.

FIG. 6 is a block diagram showing the configuration of a storage device of a second embodiment of the present invention.

A storage device 601 of FIG. 6, which has the same configuration as the storage device 101 shown in FIG. 1, is different from it in a method of data communication between the storage device 601 and a computer 602. The storage device 601 is provided with a disk storage device part 610 for storing data. Disk controllers 6041, 6042, 6043, . . . , and 604*n* (n>2, where n is an integer) include at least cache memories 6071, 6072, 6073, . . . , and 607*n*, and microprocessors (MP) 6061, 6062, 6063, . . . , and 606*n*, respectively.

Between the computer 602 and the disk controllers 6041 to 604*n*, data is transmitted and received using a protocol such as, e.g., fiber channel through a network switch 616 disposed between an interface card (IO) 603 within the computer and host adapter cards (HA) 6051, 6052, 6053, . . . , and 605*n* within the disk controllers. Connection is made by optical fibers or metallic cables between the computer 662 and the network switch 616, and between the network switch 616 and the host adapter cards 6051 to 605*n*. Such a connection method allows plural computers instead of one computer 601 as shown in FIG. 6 to be connected to the network switch 616.

On the other hand, the disk controllers 6041 to 604*n* and the disk storage device part 610 are connected with each other using a device internal network 614 such as, e.g., InfiniBand through interface adaptors 6081, 6082, 6083, . . . , 608*n*, and 617 so that data is transmitted and received between them. A storage device management part 612 is connected with the disk controllers 6041 to 604*n* and the disk storage device part 610 through an interface adaptor 613 and the device internal network 614. Through communication with them, the storage device management part 612 monitors failures of them within the storage device 601, manages configuration information, and collects load information on data access to the disk controllers 6041 to 604n and usage rate information on the cache memories 6071 to 607n.

Also in the present embodiment, when a failure occurs in the disk controllers, the failure recovery procedures shown in FIGS. 2 and 3 can be used, and when the configuration of the disk controllers is changed, the failure recovery procedures shown in FIGS. 4 and 5 can be used.

In the second embodiment, the storage device management part 612 controls the network switch 616 through the network 615 to control data communication between the computer 602 and the disk controllers 6041 to 604n.

Figure 7:
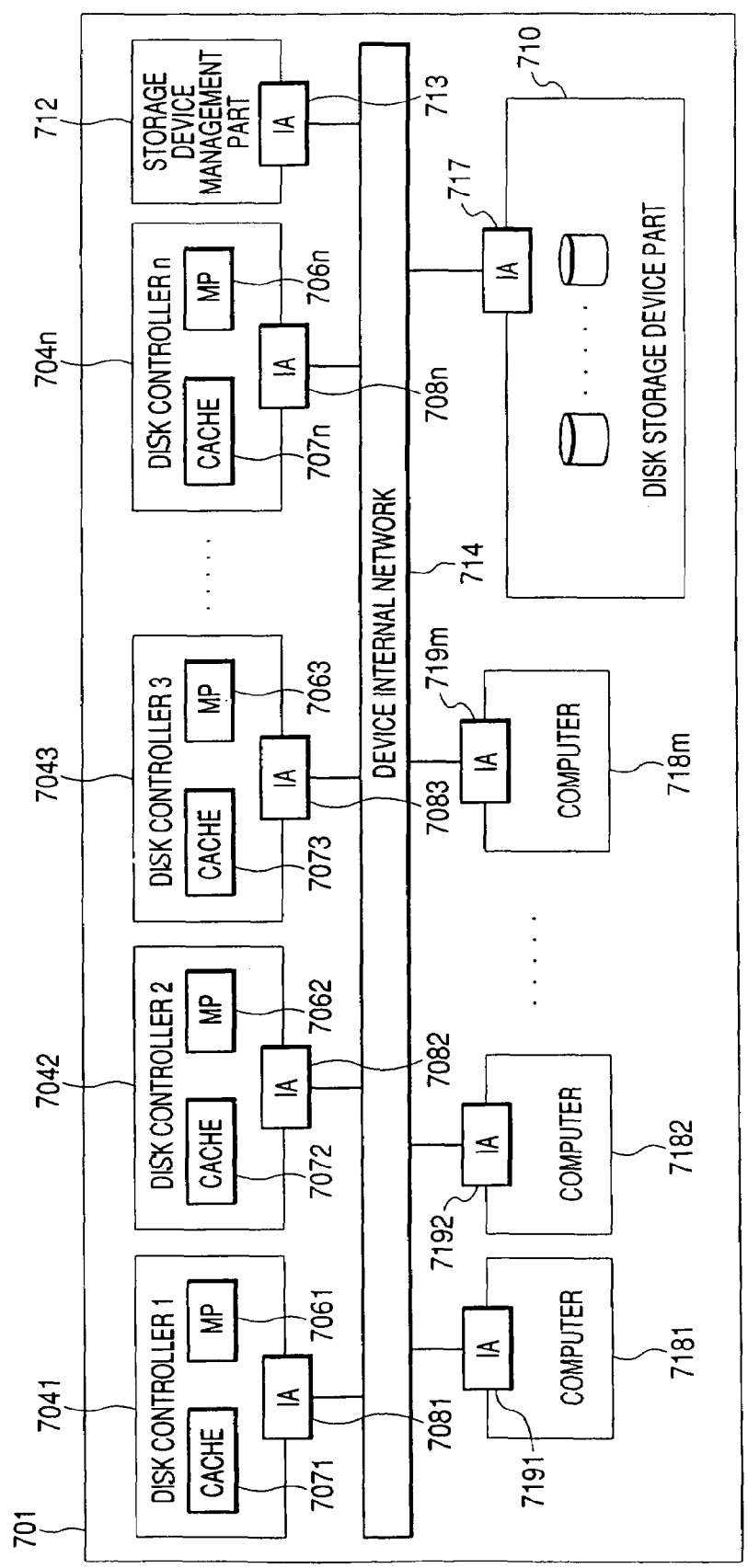
FIG. 7 is a block diagram showing the configuration of a storage device of a third embodiment of the present invention.

FIG. 7 is a block diagram showing the configuration of a storage device of a third embodiment of the present invention.

A storage device 701 shown in FIG. 7 is different from the storage device 101 of the first embodiment shown in FIG. 1, in that, instead of the computer 102, m (m>0, where m is an integer) computers 7181, 7182, ..., and 718m are included within the storage device 701. The storage device 701 is provided with a disk storage device part 710 for storing data. Disk controllers 7041, 7042, 7043, ..., and 704n (n>2, where n is an integer) include at least cache memories 7071, 7072, 7073, ..., and 707n, and microprocessors 7061, 7062, 7063, ..., and 706n, respectively.

The computers 7181 to 718m and the disk controllers 7041 to 704n are connected with each other using a device internal network 714 such as, e.g., InfiniBand through interface adaptors (IA) 7081, 7082, 7083, ..., 708n, 7191, 7192, ..., and 719m so that data is transmitted and received between them. On the other hand, the disk controllers 7041 to 704n and the disk storage device part 710 are connected with each other using a device internal network 714 such as, e.g., the above-mentioned InfiniBand through interface adaptors 7081 to 708n and 717 so that data is transmitted and received between them. The two inter-device networks may be shared as one network as shown in FIG. 7, or formed as different networks.

The storage device management part 712 is connected with the disk controllers 7041 to 704n and the disk storage device part 710 through the device internal network 714. Through communication with them, the storage device management part 712 monitors failures of the components within the storage device 701, manages configuration information of the storage device 701, and collects load information on data access of the disk controller 7041 and the like, and usage rate information of the cache memories 7071 to 707n.

Also in the third embodiment configured as described above, when a failure occurs in the disk controllers, the failure recovery procedures shown in FIGS. 2 and 3 can be used, and when the configuration of the disk controllers is changed, the configuration change procedures shown in FIGS. 4 and 5 can be used.

In the present embodiment, since the computers 7181 to 718m are included in the storage device 701, the storage device management part 712 controls the computers 7181 to 718m through the device internal network 714. Thereby, the storage device management part 712 controls data communication between the computers 7181 to 718m and the disk controllers 7041 to 704n.

In the above description, each of the disk controllers has been defined as an active, a standby one, or a backup one. However, a cache memory of the disk controllers may be split into plural areas each of which is allocated as an active cache memory, a standby one, or a backup one. For example, a cache memory may be split by the number of plural computers connected, or the number of applications used.

Figure 8:
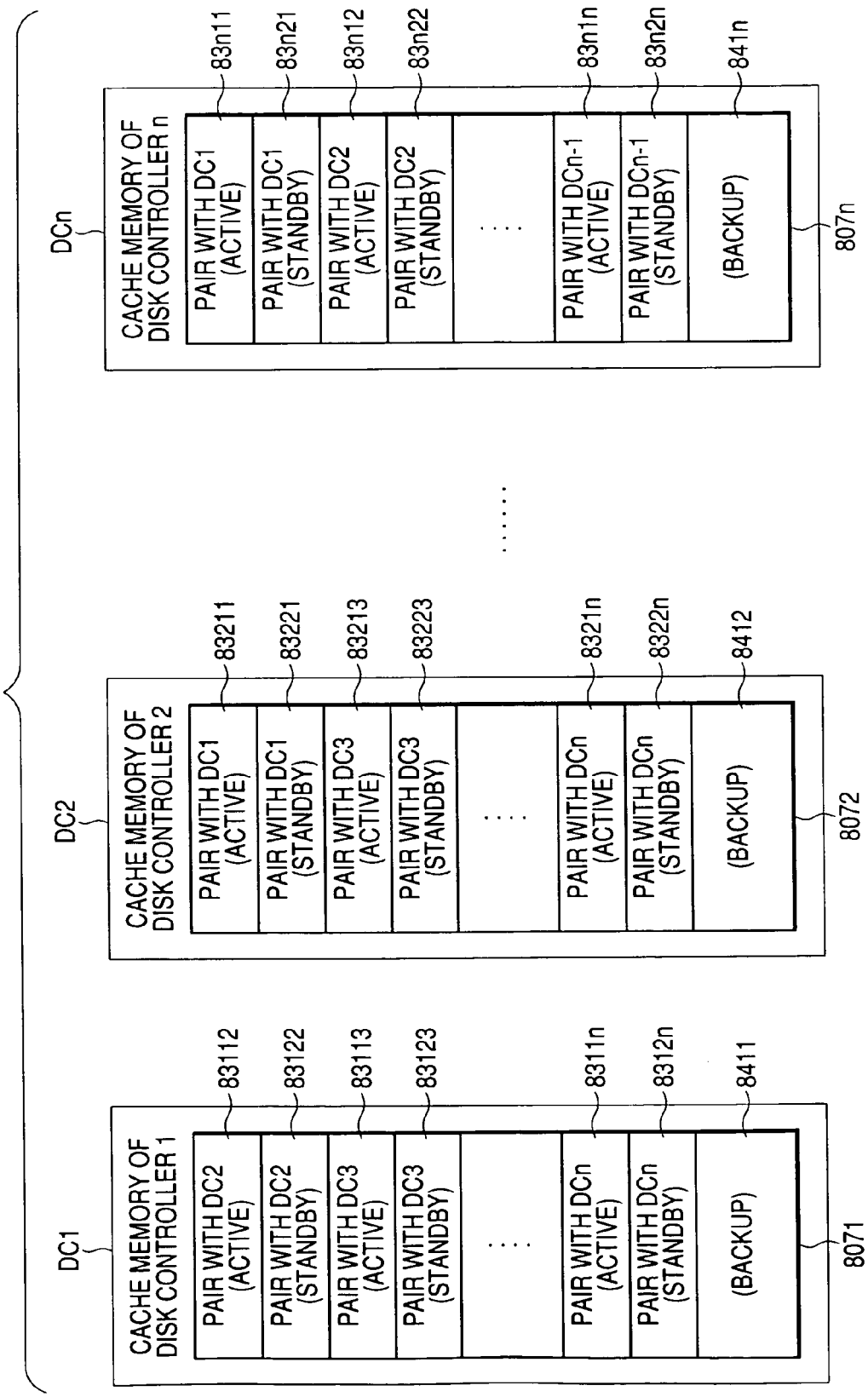
FIG. 8 is a diagram for explaining the configuration of cache memory when active cache data and standby cache data coexist in one disk controller.

FIG. 8 schematically shows the allocation of cache data on cache memories 8071, 8072, ..., and 807n of n (n>2, where n is an integer) disk controllers DC1, DC2, ..., and DCn. In FIG. 8, a cache memory of each disk controller is split into {2×(n−1)+1} areas, which are allocated to pairs of active and standby cache memories corresponding to other n−1 disk controllers, and backup ones. That is, the cache memory 8071 of the disk controller 1 is allocated 83112, 83113, ..., and 8311n areas as active cache memories paired with DC2, DC3, ..., and DCn, and 83122, 83123, ..., and 8312n areas as standby ones paired with DC2, DC3, ..., and DCn, and an 8411 area as a backup one. The cache memories 8072 to 807n of the disk controller 2, ..., and disk controller n are also split into the same areas, which are allocated to active, standby, and backup cache memories.

Metadata provided to the respective areas includes a logic address value of cash data, an identifier for identifying whether the cash data is write data or read data, an identifier indicating whether a write has been made to disk, and an identifier indicating cache data resident in a cache memory, an identifier indicating active cash data or standby cash data, and a duplex target identifier. The respective values match the attributes of the respective areas.

Also for such a configuration of the cache memories, when a failure occurs in the disk controllers, the failure recovery procedures shown in FIGS. 2 and 3 can be used, and when the configuration of the disk controllers is changed, the configuration change procedures shown in FIGS. 4 and 5 can be used.

For example, when a failure occurs in the disk controller 1, the metadata of the areas is searched for identifiers indicating active cash data or standby cash data. Then, for the active cache memory areas 83112 to 8311n, the failure recovery procedure for active mode shown in FIG. 2 is used, and for the standby cache memory areas 83122 to 8312n, the failure recovery procedure for standby mode shown in FIG. 3 is used. As a result, the duplicating of cash data has been recovered before the disk controller 1 recovers from the failure, so that, since disk access is unnecessary in the failure recovery procedure, the failure recovery processing time FT can be greatly reduced.

For example, when the disk controller 1 is changed to a standby one, the metadata of the areas is searched for identifiers indicating active cash data or standby cash data. Then, for the active cache memory areas 83112 to 8311n, the failure recovery procedure for active mode shown in FIG. 4 is used, and for the standby cache memory areas 83122 to 8312n, the failure recovery procedure for standby mode shown in FIG. 5 is used. As a result, the disk controller 1 can be dismounted for maintenance. Moreover, the operate disk controller 1 can be operated for data access from other computers.

Also, for example, when data access is concentrating on the disk controller 1, the metadata of the areas is searched for identifiers indicating active cash data or standby cash data. For several of the active cache memory areas 83112 to 8311n, the failure recovery procedure for active mode shown in FIG. 4 is used. As a result, the load of the concentrating data access can be dispersed to other disk controllers, and the data access speed between the computer 102 and the like, and the storage device 101 and the like can be improved.

Also, when a disk controller n+1 not shown is added to the storage device, the metadata of the areas is searched for identifiers indicating active cash data or standby cash data. Then, the procedure shown in FIG. 4 or 5 is used to change the disk controller configuration so as to move several of active or standby cache memory areas 83112 to 8311*n*, and 83122 to 8312*n* of other disk controllers to the disk controller n+1. As a result, data access load can be dispersed to the disk controller n+1 newly added, to improve the data access speed between the computer 102 and the like, and the storage device 101 and the like.

The present invention can, for example, apply to a storage device that constitutes a system requiring high reliability and maintenance not involving system halt such as a main transaction system of an enterprise. The present invention is effective for failure recovery, maintenance, and dispersion of data access load.

What is claimed is:

1. A method for controlling a storage device that comprises:

a storage device part including plural storage media;

plural control parts each including a processor and a cache memory, each said processor controlling data writing from a computer to the storage device part and data reading from the storage device part to the computer, and each said cache memory temporarily storing the data; and a management part that detects a failure that occurs in the control parts, wherein communication-capable connection is provided between the storage device part and the control parts, and between the control parts, the method comprising the steps of:

when the computer requests data to be written into or read from the storage device, writing the data to a cache memory of an active control part of the control parts, and copying the data from the cache memory of the active control part to a cache memory of a standby control part an writing; and when it is detected by the management part that a failure occurs in one of the active control part and the standby control part, transferring data not yet written to the storage device part of data stored in a cache memory of the other one of the active control part and the standby control part in which the failure does not occur, to a cache memory of a control part other than the active and standby control parts.

2. The method for controlling a storage device according to claim 1, wherein, when a failure occurs in the active or standby control part, all data stored in the cache memory of said control part in which the failure does not occur, is transferred to the cache memory of the control part other than the active and standby control parts, regardless whether yet written to the storage device part or not.

3. The method for controlling a storage device according to claim 1, further comprising the steps of:

writing a first identifier indicating whether the data having been written to the cache memory is on the active control part or the standby control part, and a second identifier indicating a control part to transfer a copy of the data to a cache memory thereof; and selecting data to be transferred from the cache memory of the control part in which the failure does not occur to the cache memory of the control part other than the active and standby control parts depending upon the first identifier.

4. The method for controlling a storage device according to claim 1, wherein a cache memory of the plural control parts is split into plural areas, the areas are provided with an attribute indicating whether data on the active control part is stored, or data on the standby control part is stored, and when it is detected by the management part that a failure occurs in the active or standby control part, among data stored in an area on the active or standby control part in which the failure does not occur, data not yet written to the storage device part is transferred to the cache memory of the control part other than the active and standby control parts.

5. A method for controlling a storage device that comprises:

a storage device part including plural storage media;

plural control parts each including a processor that controls data writing from a computer to the storage device part and data reading from the storage device part to the computer, and a cache memory that temporarily stores the data; and a management part that manages the configuration of the control parts, wherein communication-capable connection is provided between the storage device part and the control parts, and between the control parts, the method comprising the steps of:

when the computer requests data to be written into or read from the storage device, writing the data to a cache memory of a active control part of the control parts, and copying the data from the cache memory of the active control part to a cache memory of a standby control part; and when the management part commands change of the configuration of the control parts, transferring data stored in a cache memory of the active or standby control part in which no failure occurs to a cache memory of a control part other than the active and standby control parts.

6. The method for controlling a storage device according to claim 5, the method comprising the steps of:

writing a first identifier indicating whether the data having been written to the cache memory is on the active control part or the standby control part, and a second identifier indicating a control part to transfer a copy of the data to a cache memory thereof; and selecting data to be transferred from the cache memory of the control part in which the failure does not occur to the cache memory of the control part other than the active and standby control parts depending upon the first identifier.

7. The method for controlling a storage device according to claim 6, wherein a cache memory of the plural control parts is split into plural areas, the areas are provided with an attribute indicating whether data on the active control part is stored, or data on the standby control part is stored, and when the management part commands change of the configuration of the control parts, data stored in an area on the active or standby control part is transferred to a cache memory of a control part other than the active and standby control parts.

8. A storage device comprising:

a storage device part including plural storage media;

plural control parts each including a cache memory that temporarily stores data; and a management part, wherein communication-capable connection is provided between the storage device part and the control parts, and between the control parts, the management part includes:

means for writing data, which is requested to be written to or read from the storage device by the computers to a cache memory of an active control part of the control parts;

means for copying the data from the cache memory of the active control part to a cache memory of a standby control part;

failure detecting means for detecting a failure in the control parts; and means, when it is detected by the failure detecting means that a failure occurs in one of the active control part and the standby control part, for transferring data not yet written to the storage device part of data stored in a cache memory of the other one of the active control part and the standby control part in which the failure does not occur, to a cache memory of a control part other than the active and standby control parts.

9. The storage device according to claim 8, being connected with the computer through a network switch.

10. The storage device according to claim 8, wherein the communication-capable connection is provided between the computer and the control parts.

11. A storage device comprising:

a storage device part including plural storage media;

plural control parts each including a cache memory that temporarily stores data; and a management part, wherein communication-capable connection is provided between the storage device part and the control parts, and between the control parts, the management part includes:

means for writing data, which is requested to be written to or read from the storage device by the computer, to a cache memory of an active control part of the control parts;

means for copying the data from the cache memory of the active control part to a cache memory of a standby control part;

means for commanding a change of the configuration of the plural control parts; and means, upon receipt of a configuration change command, for transferring data stored in a cache memory of the active or standby control part in which no failure occurs to a cache memory of a control part other than the active and standby control parts.

12. The storage device according to claim 11, being connected with the computer through a network switch.

13. The storage device according to claim 11, wherein the communication-capable connection is provided between the computer and the control parts.

* * * * *